(12) United States Patent
Govindarajan et al.

(10) Patent No.: US 11,093,511 B2
(45) Date of Patent: Aug. 17, 2021

(54) RANKING SEARCH RESULTS USING HIERARCHICALLY ORGANIZED COEFFICIENTS FOR DETERMINING RELEVANCE

(71) Applicant: salesforce.com, inc., San Francisco, CA (US)

(72) Inventors: Jayesh Govindarajan, Palo Alto, CA (US); Nicholas Beng Tek Geh, San Carlos, CA (US); Ammar Haris, Lake Forest Park, WA (US)

(73) Assignee: salesforce.com, inc., San Francisco, CA (US)

( * ) Notice: Subject to any disclaimer, the term of this patent is extended or adjusted under 35 U.S.C. 154(b) by 773 days.

(21) Appl. No.: 15/728,938

(22) Filed: Oct. 10, 2017

(65) Prior Publication Data

US 2018/0101536 A1 Apr. 12, 2018

Related U.S. Application Data

(60) Provisional application No. 62/407,448, filed on Oct. 12, 2016.

(51) Int. Cl.
*G06F 16/2457* (2019.01)
*G06F 16/248* (2019.01)
*G06F 16/22* (2019.01)
*G06F 16/9535* (2019.01)

(52) U.S. Cl.
CPC .... *G06F 16/24578* (2019.01); *G06F 16/2228* (2019.01); *G06F 16/248* (2019.01); *G06F 16/2457* (2019.01); *G06F 16/9535* (2019.01)

(58) Field of Classification Search
CPC .......... G06F 16/24578; G06F 16/2228; G06F 16/9535; G06F 16/2457; G06F 16/248
USPC ....................................................... 707/711
See application file for complete search history.

(56) References Cited

U.S. PATENT DOCUMENTS

| | | | |
|---|---|---|---|
| 8,924,376 B1* | 12/2014 | Lee ................ | G06F 16/951 707/723 |
| 8,965,970 B2* | 2/2015 | Cathcart ............ | G06F 16/95 709/204 |
| 2009/0138463 A1* | 5/2009 | Chapelle .......... | G06F 16/9535 |
| 2013/0007011 A1* | 1/2013 | Setlur ............. | G06F 16/24575 707/748 |
| 2013/0024448 A1* | 1/2013 | Herbrich ........... | G06F 16/951 707/728 |

(Continued)

*Primary Examiner* — Hosain T Alam
*Assistant Examiner* — Nicholas E Allen
(74) *Attorney, Agent, or Firm* — Fenwick & West LLP

(57) ABSTRACT

An online system receives a search query from a user. In response to the request, the online system obtains search results matching the search query and identifies a set of attributes describing a context of the search query. The online system generates a data structure that includes a plurality of search coefficients. The search coefficients are selected based on the identified set of attributes. Some of the search coefficients have conflicting values. The online system traverses the data structure to identify the search coefficients having conflicting values. For each search coefficient having conflicting values, the online system resolves conflicts and determines a value of the search coefficient. The online system ranks search results based on the resolved values of the search coefficients.

19 Claims, 6 Drawing Sheets

(56) References Cited

U.S. PATENT DOCUMENTS

| | | | | |
|---|---|---|---|---|
| 2013/0339379 A1* | 12/2013 | Ferrari | ............. | G06F 16/24539 |
| | | | | 707/766 |
| 2014/0164352 A1* | 6/2014 | Denninghoff | ............ | H03H 9/25 |
| | | | | 707/711 |
| 2014/0181098 A1* | 6/2014 | Bhandari | ................ | G06F 16/38 |
| | | | | 707/728 |
| 2015/0178333 A1* | 6/2015 | Webster | ................ | G06Q 30/02 |
| | | | | 707/737 |
| 2016/0041982 A1* | 2/2016 | He | ...................... | G06F 16/9535 |
| | | | | 707/728 |
| 2016/0085813 A1* | 3/2016 | Setty | ....................... | G06T 15/20 |
| | | | | 705/26.3 |
| 2016/0117329 A1* | 4/2016 | Busey | ............... | G06F 16/24578 |
| | | | | 707/726 |
| 2016/0132570 A1* | 5/2016 | Cathcart | ................ | G06Q 10/10 |
| | | | | 707/727 |
| 2016/0299981 A1* | 10/2016 | Lu | ....................... | G06F 16/3326 |
| 2016/0360336 A1* | 12/2016 | Gross | ................ | H04M 1/72583 |
| 2017/0039578 A1* | 2/2017 | Woddi | ............. | G06F 16/24578 |

* cited by examiner

| Lightning | Home | Chatter | News | Groups | V2MOM | People | Reports | Dashboards | Accounts | More |
|---|---|---|---|---|---|---|---|---|---|---|

🔍 peter

SEARCH RESULTS

- Top Results
- Chatter
- Groups
- V2MOM
- People
- Reports
- Dashboards
- Accounts
- Opportunities
- Campaigns
- Contacts
- Cases
- Leads
- Files
- Tasks
- Notes
- Events
- \> Show More ⓘ Showing results for "peter" and spell-corrected terms.

People
3 • Results • Sorted by Relevance                                   View More

| FULL NAME | USER NAME | EMAIL | ROLE | PROFILE |
|---|---|---|---|---|
| Peter Harry | peterh@salesforce.com | peterh@salesforce.com | President's Committee | SFCD Manager |
| Steve Peter | s.peter@sakesforece.com | s.peter@sakesforece.com | AMER.SFKC.STRAT… | Global Field Sales |
| Nancy Peter | npeter@sakesforece.com | npeter@sakesforece.com | President's Committee | Data Quality |

Accounts
2 • Results • Sorted by Relevance                                   View More

| ACCOUNT NAME | ACCOUNT NAME (LOCAL) | ACCOUNT OWNER | ACCOUNT OWNER ALIAS | ACCOUNT NO. |
|---|---|---|---|---|
| Peter-Henry Corp. | Peter-Henry Corp. | | jholt | 4-396086 |
| Peter Baking Co. | Peter Baking Co. | | ahosa | 4-347922 |

Files
2 • Results • Sorted by Relevance                                   View More

| TITLE | SIZE | FILE EXT. | OWNER |
|---|---|---|---|
| Peter and Larry | 144KB | pdf | John Doe |
| Peter-Henry 3-Year Proposed Contract | 1MB | xlsx | Sam Manning |

FIG. 4

RANKING SEARCH RESULTS USING HIERARCHICALLY ORGANIZED COEFFICIENTS FOR DETERMINING RELEVANCE

CROSS-REFERENCE TO RELATED APPLICATIONS

This application claims the benefit of U.S. Provisional Application No. 62/407,448, filed Oct. 12, 2016, which is incorporated by reference herein.

BACKGROUND

Field of Art

The disclosure relates generally to ranking of search results, and more particularly to ranking search results using hierarchically organized coefficients for determining relevance.

Description of the Related Art

Online systems used by enterprises store large amount of data describing entities associated with the enterprise such as user accounts, documents, transactions, and so on. The online systems usually include or otherwise are associated with search engines that allow users to search data by specifying search queries. However, given the large amount of data stored at online systems, it is important to rank the search results before presenting them to the users. Conventional techniques for ranking search results use the same ranking criteria for all users. However, the significance of search results may be different in different contexts, for example, users having different roles within an enterprise may find different types of objects significant. Currently available search engines use the same criteria for ranking search results across different contexts. For example, different types of users may all get the search results in the same order if they perform the same search. Ranking search results such that the user does not find relevant search results at the top provides poor user experience.

BRIEF DESCRIPTION OF DRAWINGS

The disclosed embodiments have advantages and features which will be apparent from the detailed description, the appended claims, and the accompanying figures (or drawings). A brief introduction of the figures is below.

FIG. 4 illustrates example nested objects that include search coefficients with conflicting values, in accordance with an embodiment.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overview

An online system stores objects of one or more organizations and provides tools that provide valuable information to users of the organizations. An example of the online system is a multi-tenant system that stores data for multiple enterprises and allows users of each enterprise to interact with the stored data using various tools. An example of a functionality provided by the online system is a search engine that allows users to perform search for documents and objects stored in the online system. The search engine provides ranked search results matching a search query specified by a user.

Embodiments of the invention identify a context of a search query and rank search results based on the context. For example, the online system may rank search results for a particular user based on one ranking criteria and for another user using a different ranking criteria. The search engine identifies a set of attributes describing a context of the search query. For example, the context of the search query may be represented using attributes describing the enterprise that the user belongs to, a role of the user within the enterprise, the type of objects that the user is searching for, and so on. The search engine generates a hierarchical data structure representing the context of the search. The data structure includes a plurality of search parameters, values of which may be determined using a model trained using machine learning techniques. The search parameters may have conflicting values. For example, a search parameter may have a particular value because the user belongs to a particular enterprise but the same search parameter may have a different value because the user is searching for a particular type of objects. The search engine resolves conflicts between search parameters based on precedence rules and ranks the search results based on the resolved values of the conflicting search parameters.

System Architecture

Figure 1:
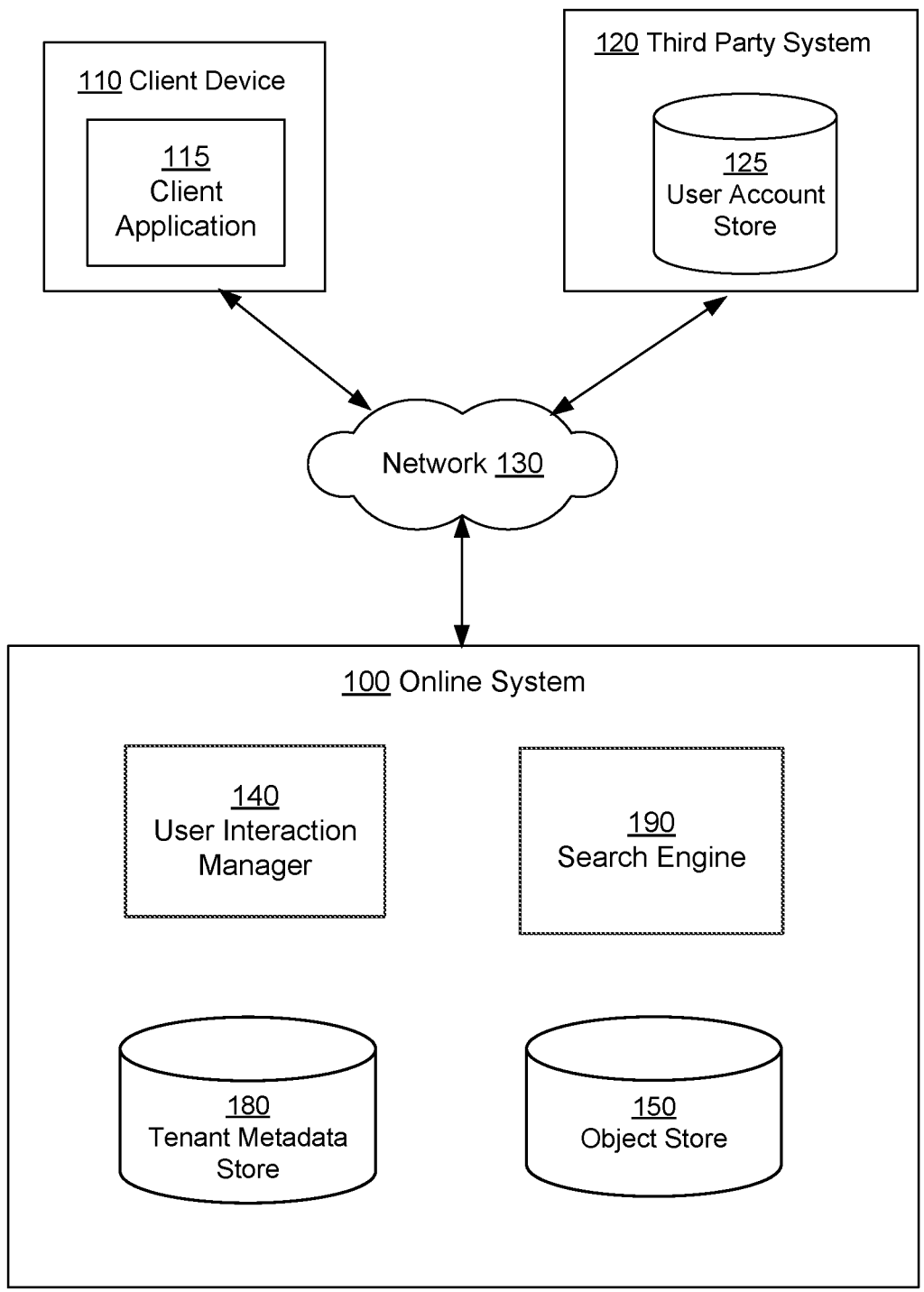
FIG. 1 shows an overall system environment illustrating an online system, in accordance with an embodiment.

FIG. 1 shows an overall system environment illustrating an online system 100, in accordance with an embodiment. The overall system environment includes an online system 100, one or more client devices 110, a third party system 120, and a network 130. Other embodiments may use more or less or different systems than those illustrated in FIG. 1. For example, the overall system environment can include multiple client devices 110 and multiple third party systems 120. Functions of various modules and systems described herein can be implemented by other modules and/or systems than those described herein. FIG. 1 and the other figures use like reference numerals to identify like elements.

The client device 110 is used by a user to interact with the online system 100. The client device 110 is one or more computing devices capable of receiving user input as well as transmitting and/or receiving data via the network 130. In one embodiment, the client device 110 is a conventional computer system, such as a desktop or a laptop computer. Alternatively, the client device 110 may be a device having computer functionality, such as a personal digital assistant (PDA), a mobile telephone, a smartphone, or another suitable device. The client device 110 executes a client application 115 allowing the user of the client device 110 to interact with the online system 100. An example of the client application 115 is a browser application. Using the client application 115, the client device 110 presents user interfaces configured by the online system 100. In some embodiments, the user interacts with the online system 100 through requests sent by the client application 115 over the network 130.

The third party system 120 is associated with a third party. The third party may be an enterprise or a potential customer of an enterprise associated with the online system 100. The third party system 120 includes a user account store 135 that stores information describing users of the third party system 120. The third party system 120 may include other components not shown in FIG. 1.

The online system 100 stores information associated with one or more enterprises. The information stored in connection with an enterprise in the online system 100 includes objects representing various entities associated with the enterprise, for example, user accounts representing users, objects representing potential transactions, and so on. The information stored in connection with an enterprise in the online system 100 includes historical data representing various interactions associated with enterprises, for example, user interactions associated with a potential transaction.

In some embodiments, an online system 100 is a multi-tenant system. The online system 100 stores metadata describing the tenants in tenant metadata store 180. Each tenant may be an enterprise as described herein. As an example, one tenant might be a company that employs a sales force where each salesperson uses a client device 110 to manage their sales process. Thus, a online system 100 may maintain for a user, data such as contact data, leads data, customer follow-up data, performance data, goals and progress data, etc., all applicable to that user's personal sales process.

The online system 100 includes a user interaction manager 140, an object store 150, a tenant metadata store 180, and a search engine 190. Other embodiments may include more or fewer modules than those indicated herein. Functions indicated herein as being performed by a module may be performed by other modules than those indicated herein.

The user interaction manager 140 configures user interfaces for presenting to users via client devices 110. The user interaction manager 140 receives user interactions from client devices 110. For example, the user interaction manager 140 receives search queries from client devices 110. In an embodiment, the user interaction manager 140 configures a user interface that allows users to provide information describing user interactions that are performed outside the online system 100. For example, if a first user of the online system 100 interacts with a second user of the third party system 120 via phone, the first user may provide information describing the call via a user interface to the user interaction manager 140.

The object store 150 stores data represented as objects. Each object represents an entity associated with an enterprise. An enterprise may be an organization, a business, a company, a club, or a social group. An object may have an object type associated with a type of entity described by the object. Examples of object type include an account, a contact, a lead, an opportunity, and so on. An object may represent an account representing a business partner or potential business partner (e.g. a client, vendor, distributor, etc.) of a user, and may include attributes describing a company, subsidiaries, or contacts at the company. As another example, an object may represent a project that a user is working on with an existing partner, or a project that the user is trying to get. An object may represent an account representing a user or another entity associated with the enterprise. For example, an account may represent a customer of the first enterprise. An object may represent a user of the online system.

In an embodiment, the object store 150 stores an object as one or more records in a database. An object has data fields that are defined by the structure of the object (e.g. fields of certain data types and purposes). For example, an object representing an entity may store information describing the potential customer, a status of the opportunity indicating a stage of interaction with the customer, and so on.

The object store 150 may be implemented as a relational database storing one or more tables. Each table contains one or more data categories logically arranged as columns or fields. Each row or record of a table contains an instance of data for each category defined by the fields. For example, an object store 150 may include a table that describes a customer with fields for basic contact information such as name, address, phone number, fax number, etc. Another table might describe a purchase order, including fields for information such as customer, product, sale price, date, etc.

An object may include links or references to other objects. For example an opportunity object may include links to contact objects and account objects, an account object may include links to contact objects and so on. An object may have outgoing links that allow the object to refer to other objects as well as incoming links that allow other objects to refer to the object.

The search engine 190 receives a search query from a user and provides ranked search results matching the search query to the user. For example, the search engine 190 obtains search results matching the search query. The search results include a plurality of objects stored in the object store 150. Also, the search engine 190 ranks the search results. To rank the search results, the search engine 190 identifies a set of attributes describing a context of the search query. The context of the search query can include characteristics of the user, characteristics of a type of object searched by the user, etc. Further, the search engine 190 generates a data structure based on the identified set of attributes. The data structure includes a plurality of search coefficients. The search engine uses the search coefficients to rank search results. In an embodiment, each search coefficient represents a weight of a feature considered for determining relevance of a search result. A search coefficient may also be referred to herein as a search parameter. In an embodiment, the online system 100 determines the search coefficients and their values using a machine learning based model. The machine learning based model is trained based on historical search queries used as training data.

One or more of the search coefficients are associated with multiple conflicting values ("conflicting search coefficients"). The search engine 190 traverses the data structure to identify conflicting search coefficients and obtain a resolved value for each conflicting search coefficient based on precedence rules. In some embodiments, the data structure is hierarchical and comprises multiple levels. Objects in one level may be connected to objects in another level by parent child relations. To objects connected directly or indirectly via parent child relationships may specify conflicting search coefficients. In one embodiment, a first value of the conflicting search coefficient takes precedence over a second value of the conflicting search coefficient in accordance with certain precedence rules. For example, a first value of the conflicting search coefficient associated with a lower hierarchy level takes precedence over with a second value of the conflicting search coefficient associated with a higher hierarchy level. In some embodiments, the search engine 190 selects a value with highest precedence as the resolved value of the conflicting search coefficient. Based on the resolved values of the conflicting search coefficients, the search engine 190 ranks the search results.

In one embodiment, the online system 100 implements a web-based customer relationship management (CRM) system. For example, in one embodiment, the online system 100 includes application servers configured to implement and execute CRM software applications as well as provide related data, code, forms, webpages and other information to and from client devices 110 and to store to, and retrieve from, a database system related data, objects, and webpage content.

With a multi-tenant system, data for multiple tenants may be stored in the same physical database, however, tenant data typically is arranged so that data of one tenant is kept logically separate from that of other tenants so that one tenant does not have access to another tenant's data, unless such data is expressly shared. The tenant metadata store 180 stores information that allows identification of data for different tenants, for example, using identifiers that uniquely identify each tenant. The tenant metadata store 180 stores various stages of potential transaction objects defined by an enterprise.

In certain embodiments, the online system 100 implements applications other than, or in addition to, a CRM application. For example, the online system 100 may provide tenant access to multiple hosted (standard and custom) applications, including a CRM application. According to one embodiment, the online system 100 is configured to provide webpages, forms, applications, data and media content to client devices 110 to support the access by client devices 110 as tenants of online system 100. As such, online system 100 provides security mechanisms to keep each tenant's data separate unless the data is shared.

A multi-tenant system may implement security protocols that keep data, applications, and application use separate for different tenants. In addition to user-specific data and tenant-specific data, the online system 100 may maintain system level data usable by multiple tenants or other data. Such system level data may include industry reports, news, postings, and the like that are sharable among tenants.

It is transparent to customers that their data may be stored in a table that is shared with data of other customers. A database table may store rows for a plurality of customers. Accordingly, in a multi-tenant system various elements of hardware and software of the system may be shared by one or more customers. For example, the online system 100 may execute an application server that simultaneously processes requests for a number of customers.

The online system 100 and client device 110 shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. The online system 100 stores the software modules storing instructions for embodiments, for example object analyzer 130.

The interactions between the client devices 110 and the online system 100 are typically performed via a network 130, for example, via the Internet. In one embodiment, the network uses standard communications technologies and/or protocols. In another embodiment, the entities can use custom and/or dedicated data communications technologies instead of, or in addition to, the ones described above. The techniques disclosed herein can be used with any type of communication technology, so long as the communication technology supports receiving by the online system 100 of web requests from a sender, for example, a client device 110 and transmitting of results obtained by processing the web request to the sender.

Search Results Ranking

Figure 2:
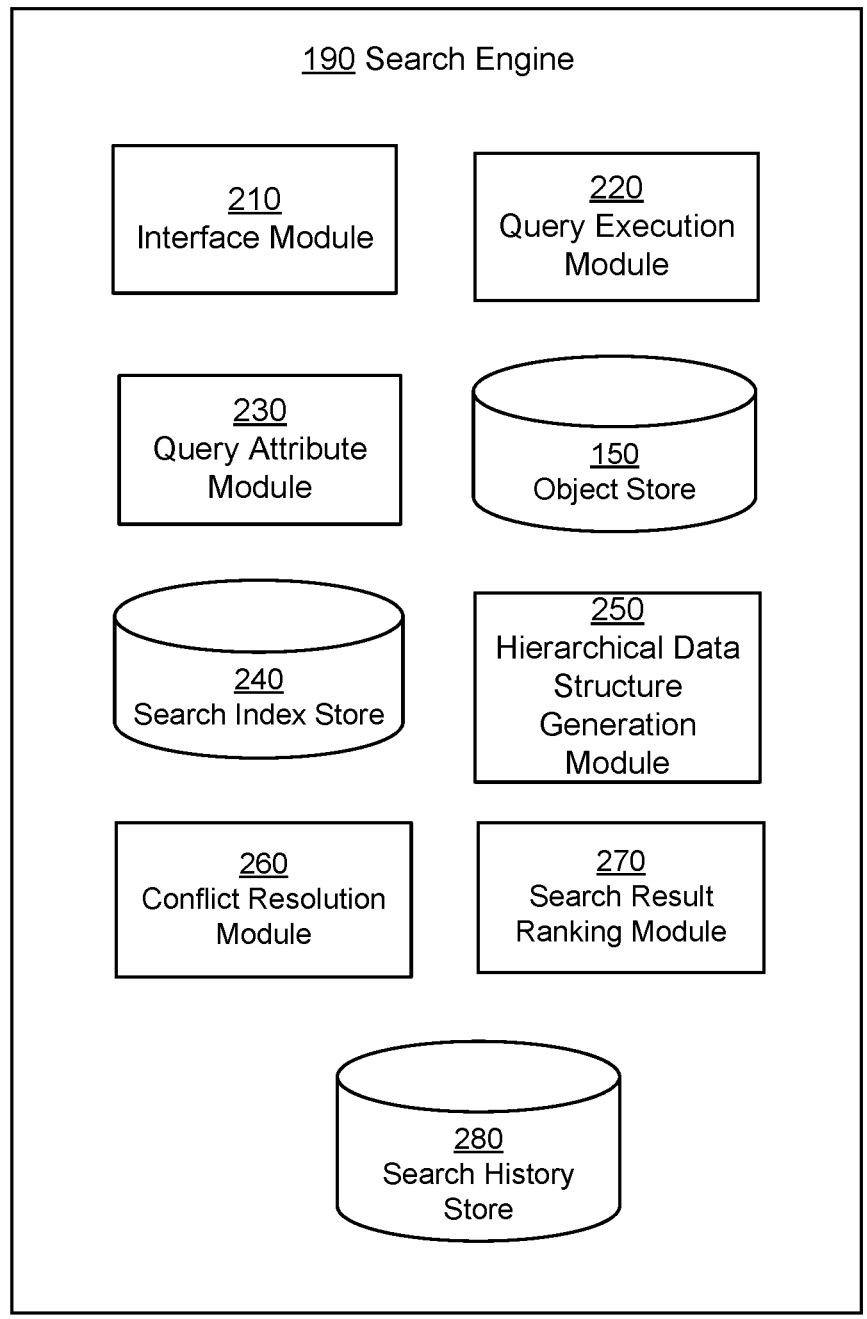
FIG. 2 is a block diagram of a search engine of the online system, in accordance with an embodiment.

FIG. 2 is a block diagram of a search engine 190 of the online system 100, in accordance with an embodiment. The search engine 190 includes an interface module 210, a query execution module 220, a query attribute module 230, an object store 150, a search index store 240, a hierarchical data structure generation module 250, a conflict resolution module 260, a search result ranking module 270, and a search history store 280. In other embodiments, the online system 140 may include additional, fewer, or different components for various applications.

The interface module 210 facilitates communication of the search engine 190 with other entities. The interface module 210 receives a search query from a user. For example, a client device 110 associated with the user sends the search query to the user interaction manager 140 of the online system 100. The interface module 210 receives the search query from the user interaction manager 140. In some embodiments, the search query specifies a search criteria that includes one or more search terms. The interface module 210 invokes various modules of the search engine 190 to determine search results matching the received search query. The interface module 210 sends the search results matching the search query to the entity requesting the search results, e.g., to the user interaction manager 140. The user interaction manager 140 furthers send the ranked search results to the client device 110 associated with the user.

The query execution module 220 executes the search query to obtain search results matching the search query. The obtained search results represent documents or objects stored in the object store 150 that satisfy the search criteria specified in the search query. In some embodiments, the query execution module 220 develops a query plan for executing a search query. The query execution module 220 executes the query plan to obtain the search results that satisfy the search criteria specified in the search query. For example, the search query includes one or more search terms. The query execution module 220 identifies objects associated description information that matches a search term. The description information of an object can include an ID, name, content, or other types of information associated with the object. The identified objects can be of a single type or multiple types. Types of the objects include objects representing people/users, user accounts, files, reports, and other types of objects. The query execution module 220 retrieves the identified objects from the object store 150. A search query may be limited to a particular type of objects.

For example, a search query may request objects representing accounts that have a particular last name, or reports that include certain search terms.

The query execution module 220 stores information related to the search query and search results in the search history store 280. For example, the query execution module 220 stores the search query received by the online system 100 as well as information describing the search results identified in response to the search query. The query execution module 220 also stores information identifying accessed search results. An accessed search results represent search results for which the online system receives a request for additional information responsive to providing the search results to a requestor. For example, the search results may be presented to the user via the client device 120 such that each search result displays a link providing access to the object represented by the search result. Accordingly, a result is an accessed result if the user clicks on the link presented with the result. The data stored in the search history store 280 may be used as training data for training machine learning models, for example, to identify which search result a user clicked on to determine a quality of search results returned to the user.

In an embodiment, the search history store 280 stores historical data in a file, for example, as a tuple comprising values separated by a separator token such as a comma. In another embodiment, the search history store 280 is a relational database that stores information describing searches as tables or relations. The search history store 280 may include references to objects stored in the object store 150. For example, each search result may identify an object stored in the object store 150.

The query attribute module 230 identifies a set of attributes describing a context of the search query. The context of the search query includes characteristics of the user. Characteristics of the user includes a user ID, an organization associated with the user, a customized search coefficient associated with the user, an indicator indicating whether the user is in a control group or an experimental group of an A/B experiment, other types of characteristics of the user, and any combination thereof. The characteristics of the user can further include biographic information, demographic information, and other types of descriptive information of the user. The context of the search query further includes characteristic of the search query, a type of object being searched by the user, or any combination thereof.

The hierarchical data structure generation module 250 generates a hierarchical data structure based on the identified set of attributes. The data structure includes a plurality of search coefficients. The search coefficients include coefficient for last modified, coefficient for page view, coefficient for last activity, coefficient for case status, coefficient for opportunity closed rate, coefficient for case escalation, coefficient for case status, coefficient for case closed, coefficient for opportunity closed, coefficient for opportunity closed date, coefficient for User is Me, or other types of coefficients. The hierarchical data structure generation module 250 determines the search coefficients and their values based on the identified set of attributes. For example, the search engine 190 inputs the identified set of attributes into a model (not shown in FIG. 2) trained using machine learning techniques. The trained model outputs the search coefficients and their values. One or more search coefficients of the data structure are conflicting search coefficient. A conflicting search coefficient has multiple but conflicting (i.e., different) values.

For example, the data structure includes a search coefficient for last modified that have two values: one is 1.5 and the other is 2.5.

In some embodiments, the data structure includes a plurality of objects, each object representing a group of search coefficient values. The hierarchical data structure generation module 250 generates the groups based on the identified set of attributes. In one embodiment, the hierarchical data structure generation module 250 generates one or more general groups and one or more specific groups. A general group can be applicable to multiple organizations or multiple users, versus a specific group is applicable to a specific type of organization, a specific type of object, or a specific type of user. Specific groups include A/B experiment groups, user-specific groups, object type-specific groups, etc. For example, the hierarchical data structure generation module 250 generates an A/B experiment group based on an indicator that the user belongs to an experimental group of an A/B experiment. Also, the hierarchical data structure generation module 250 can generate a user-specific group based on an ID and/or a customized search coefficient associated with the user. Further, the hierarchical data structure generation module 250 can generate an organization-specific group based on an organization associated with the user and an object type-specific groups based on a type of object being searched by the user. A group of search coefficients can be a nested object. In one embodiment, a nested object is represented using JavaScript Objection Notation (JSON) format, which have an advantage of being compact. In alternative embodiments, a nested object can be represented using XML format or other types of formats.

In an embodiment, the data structure is a hierarchical data structure and values of a conflicting search coefficient are associated with different precedence. For example, the groups of the data structure are associated with different hierarchy levels. In some embodiments, a general group is associated with a higher hierarchy level than specific groups. Specific groups can be associated with different hierarchy levels. For example, a general group is associated with a higher hierarchy level than an organization-specific group, and an organization-specific group is associated with a higher hierarchy level than an object type-specific group, an object type-specific group is associated with a higher hierarchy level than a user-specific group, and a user-specific group is associated with a higher hierarchy level than an A/B experiment group. Additionally or alternatively, the groups have a parent-child relationship, where a first group is a parent related to a second group that is a child. A parent group is associated with a higher hierarchy level than its corresponding child group. The hierarchy is predetermined, e.g., by a privileged or expert user of the online system 100.

Different groups may specific different values of a conflicting search coefficient. A value of a conflicting search coefficient have precedence corresponding to a hierarchy level of a group that include the value. In one embodiment, a first value of conflicting search coefficient included in a first group associated with a lower level of hierarchy has higher precedence compared with a second value of the conflicting search coefficient included in a second group associated with a higher level of hierarchy. For example, the first group and the second group both include the search coefficient for last modified, but the value of the search coefficient for last modified is 1.5 in the first group versus 2.5 in the second group. The value in the first group take precedence over the value in the second group.

The conflict resolution module 260 traverses the data structure to identify conflicting search coefficients in the data structure. In some embodiments, the conflict resolution module 260 identifies search coefficients that are associated with different values in the data structure. For example, the conflict resolution module 260 compares search coefficients among the groups in the data structure and identifies search coefficients that are included in multiple groups but have different values in the multiple groups.

The conflict resolution module 260 further resolves conflicts of the identified conflicting search coefficients based on precedence rules. For example, the conflict resolution module 260 selects one of the values of the conflicting search coefficient as a resolved value. For example, the resolved value is the value that has highest (or higher) precedence. Taking the conflicting search coefficient for last modified as an example again, the conflict resolution module 260 selects the value 1.5 as the resolved value because the value 1.5 takes precedence over the value 2.5. In some other embodiments, the conflict resolution module 260 determines a resolved value for a conflicting search coefficient using other methods. The conflict resolution module 260 can further generate a resolve group that includes resolved values of the conflicting search coefficients and value of non-conflicting search coefficients.

The search result ranking module 270 ranks the search results based on the resolved values of the identified conflicting search coefficients. Also, the ranking can be further based on values of non-conflicting search coefficients of the data structure. In some embodiments, the search result ranking module 270 sends the resolved values of the conflicting search coefficients (or the resolved group generated by the conflict resolution module 260) to the search engine 190. The search engine 190 outputs search results ranked in accordance with the search coefficients received.

Figure 3A:
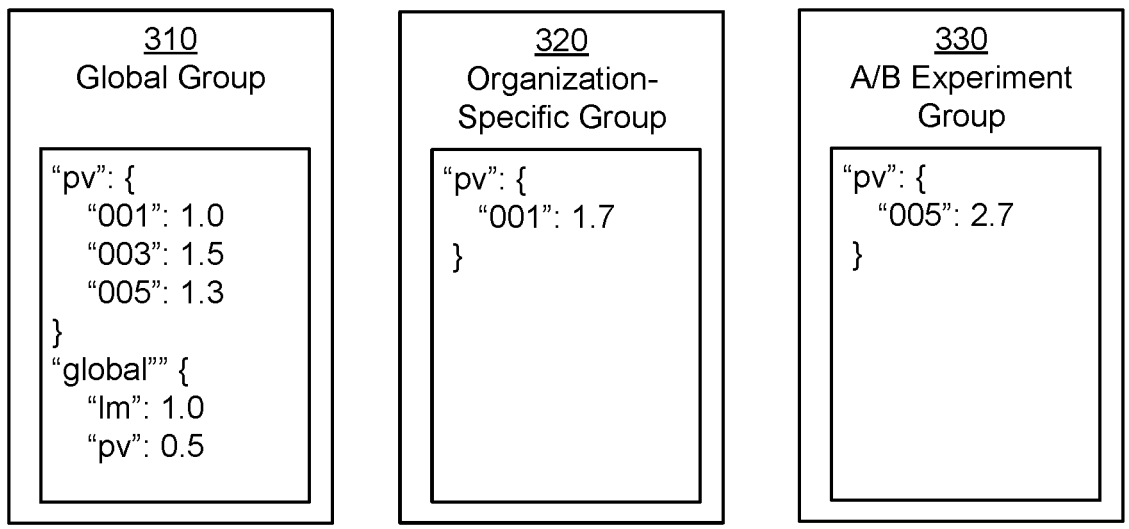
FIG. 3A illustrates an example data structure that include search coefficients with conflicting values, in accordance with an embodiment.

FIG. 3A illustrates an example data structure 300 that include search coefficients with conflicting values, in accordance with an embodiment. As shown in FIG. 3, the data structure 300 includes three groups of search coefficients 310, 320 and 330. The group 310 is a global group, the group 320 is an organization-specific group, and the group 330 is an A/B experiment group. In other embodiments, the data structure 300 may have a different number of groups or different types of groups. For example, the data structure 300 may further include a user-specific group.

The group 310 include two subgroups: a page view subgroup ("pv") and a global subgroup ("global"). The page view subgroup includes three search coefficients for page view: 001, 003, and 005. In the embodiment of FIG. 3A, "001" means that the model is being applied for Account records, "003" means that the model is being applied for Contact records, and "005" means that the model is being applied for User records. The global subgroup includes and a search coefficient for last modified and a search coefficient for page view.

The group 320 includes the search coefficient page view 001. However, the search coefficient page view 001 in the group 320 has a different value from the value of the search coefficient page view 001 in the group 310. Accordingly, the search coefficient page view 001 is a conflicting search coefficient. The two values of the search coefficient page view 001 have different precedence, corresponding to different levels of hierarchy of the group 310 and group 320. In the embodiment of FIG. 3A, the group 310 is associated with a higher hierarchy level than the group 320 and therefore, the value of the search coefficient page view 001 in group 320 (1.0) take precedence over the value of the search coefficient page view 001 in group 310 (1.7). The group 330 includes the search coefficient page view 005. And the search coefficient page view 005 in the group 330 has a different value from the search coefficient page view 005 in the group 310. Accordingly, the search coefficient page view 005 is also a conflicting search coefficient. And the value of the search coefficient page view 005 in group 330 (2.7) take precedence over the value of the search coefficient page view 005 in group 310 (1.3) because the group 310 is associated with a higher hierarchy level than the group 330.

The other search coefficients in the data structure 300 do not have more than one value, and therefore, are non-conflicting search coefficients. Conflicts of the search coefficient page view 001 and search coefficient page view 005 can be resolved.

Figure 3B:
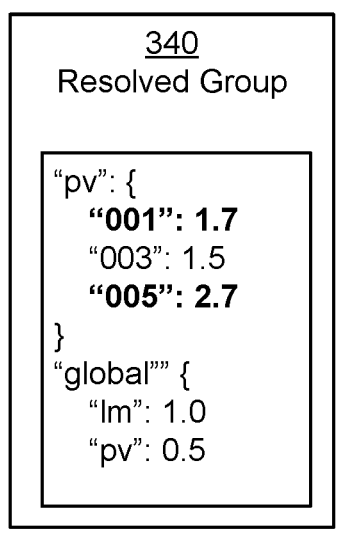
FIG. 3B shows an example resolved group of the data structure in FIG. 3A, in accordance with an embodiment.

FIG. 3B shows an example resolved group 340 of the data structure 300 in FIG. 3A, in accordance with an embodiment. The resolve group 340 includes resolved values of the conflicting search coefficients (i.e., the search coefficient page view 001 and search coefficient page view 005) and values of the non-conflicting search coefficients. In the embodiment of FIG. 3B, the resolved value of each of the conflicting search coefficients is the value having higher precedence, i.e., the value of the conflicting search coefficient in the group associated with a lower hierarchy level. Accordingly, the resolved value of the search coefficient page view 001 (highlighted in FIG. 3B) is 1.7 and the resolved value of the search coefficient page view 005 (highlighted in FIG. 3B) is 2.7. In other embodiments, conflicts in the conflicting search coefficients can be resolved using different precedence rules.

FIG. 4 illustrates example user interface providing ranked search results matching a search query, in accordance with an embodiment. In the embodiment of FIG. 4, a user provides a search query "parker." The search results presented to the user includes three categories: People, Accounts, and Files. Each category includes multiple objects. The objects under each category are sorted by relevance. The relevance of each search result is determined as a weighted aggregate value based on various features associated with the search result. The weights of the features correspond to the resolved search coefficients. As shown in FIG. 4, the user interface shows results under "Home," and includes the three categories. The user interface provide users an option to select a specific category by clicking a tab corresponding to the specific category. For example, a user may choose "People" and be provided with objects in the category of People. The search results can include more objects (or objects in different categories) than those shown in FIG. 4.

Figure 5:
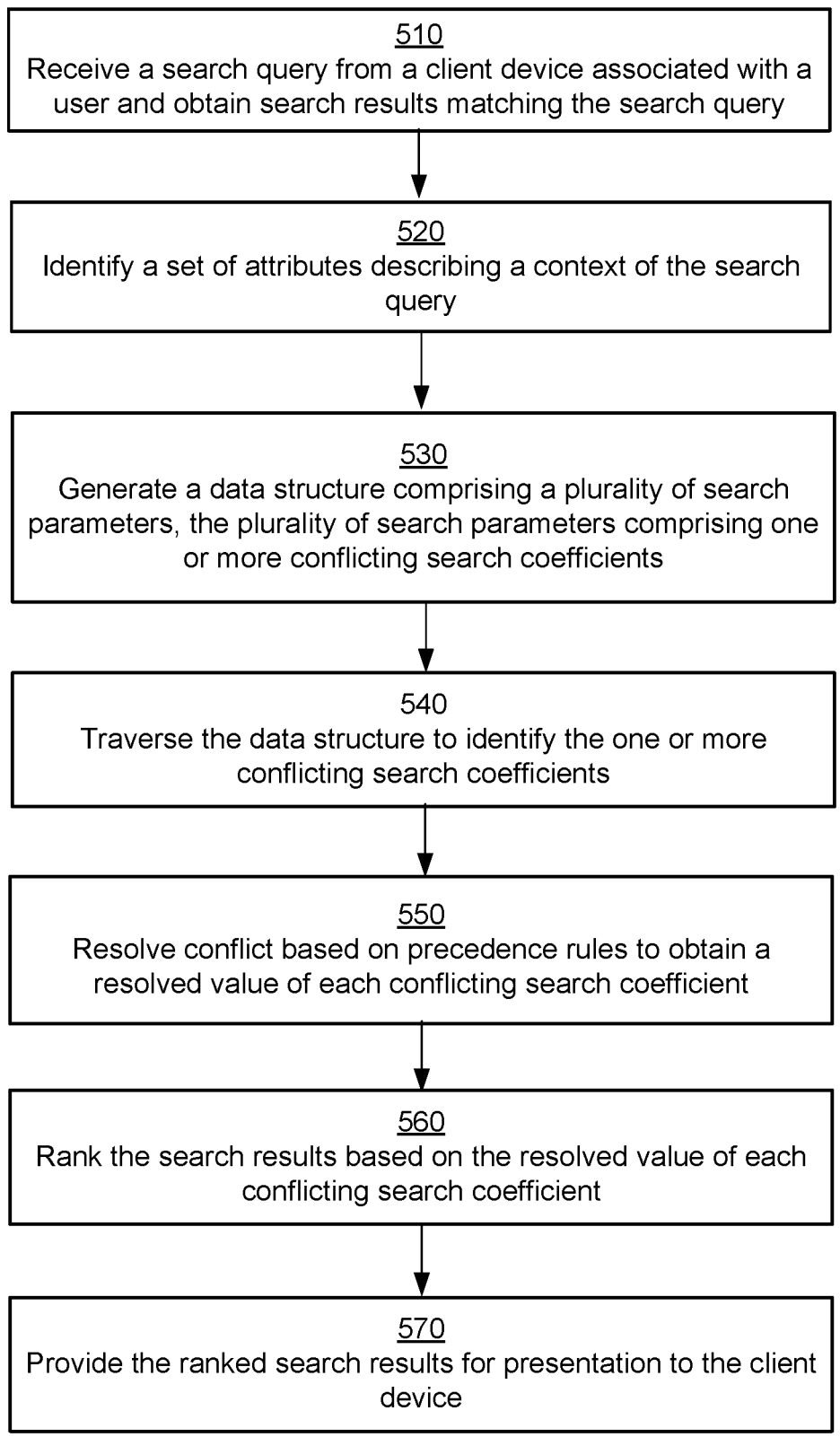
FIG. 5 is a flowchart illustrating a process for ranking search results in response to a search query from a user, in accordance with an embodiment.

FIG. 5 is a flowchart illustrating a process for ranking search results in response to a search query from a user, in accordance with an embodiment. In some embodiments, the process is performed by the search engine 190 of the online system 100, although some or all of the operations in the method may be performed by other entities in other embodiments. In some embodiments, the operations in the flow chart are performed in a different order and can include different and/or additional steps.

The search engine 190 receives 510 a search query from a client device associated with a user and obtain 510 search results matching the search query. In some embodiments, the search query includes one or more search terms. The obtained search results includes objects, description information of which matches at least one search term. Description information of an object includes a name, title, position, profile information, an ID, or other types of information related to the object. The search engine 190 identifies 520 a set of attributes describing a context of the search query. The identified set attributes can include attributes describing characteristics of the user, characteristic of the search terms of the query, characteristic of a type of object being search by the user, or any combination thereof.

The search engine 190 generates 530 a data structure comprising a plurality of search coefficients, the plurality of search coefficients comprising one or more conflicting search coefficients. A conflicting search coefficient is a search coefficient having conflicting values. In some embodiments, the data structure is a hierarchical data structure that includes a plurality of groups of search coefficients. The groups are associated with a different hierarch level. Different groups can have a same conflicting search coefficient, but the values of the conflicting search coefficient in the different groups are conflicting. The values of the conflicting search coefficient have different precedence corresponding to hierarchy levels of the different groups. For example, a value in a group associated with a lower hierarchy level takes precedence over a value in a group associated with a higher hierarchy level. The search engine 190 traverse 540 the data structure to identify the one or more conflicting search coefficients. The other search coefficients are non-conflicting search coefficients.

The search engine 190 resolves 550 conflict based on precedence rules to obtain a resolved value of each conflicting search coefficient. For example, the search engine 190 selects a value of a conflicting search coefficient that has highest (or higher) precedence. The search engine 190 ranks 560 the search results based on the resolved value of each conflicting search coefficient. For example, the search engine 190 sends the resolved values to a trained ranking model, which outputs rankings of the search results. The search engine 190 provides 570 the ranked search results for presentation to the client device.

Figure 6:
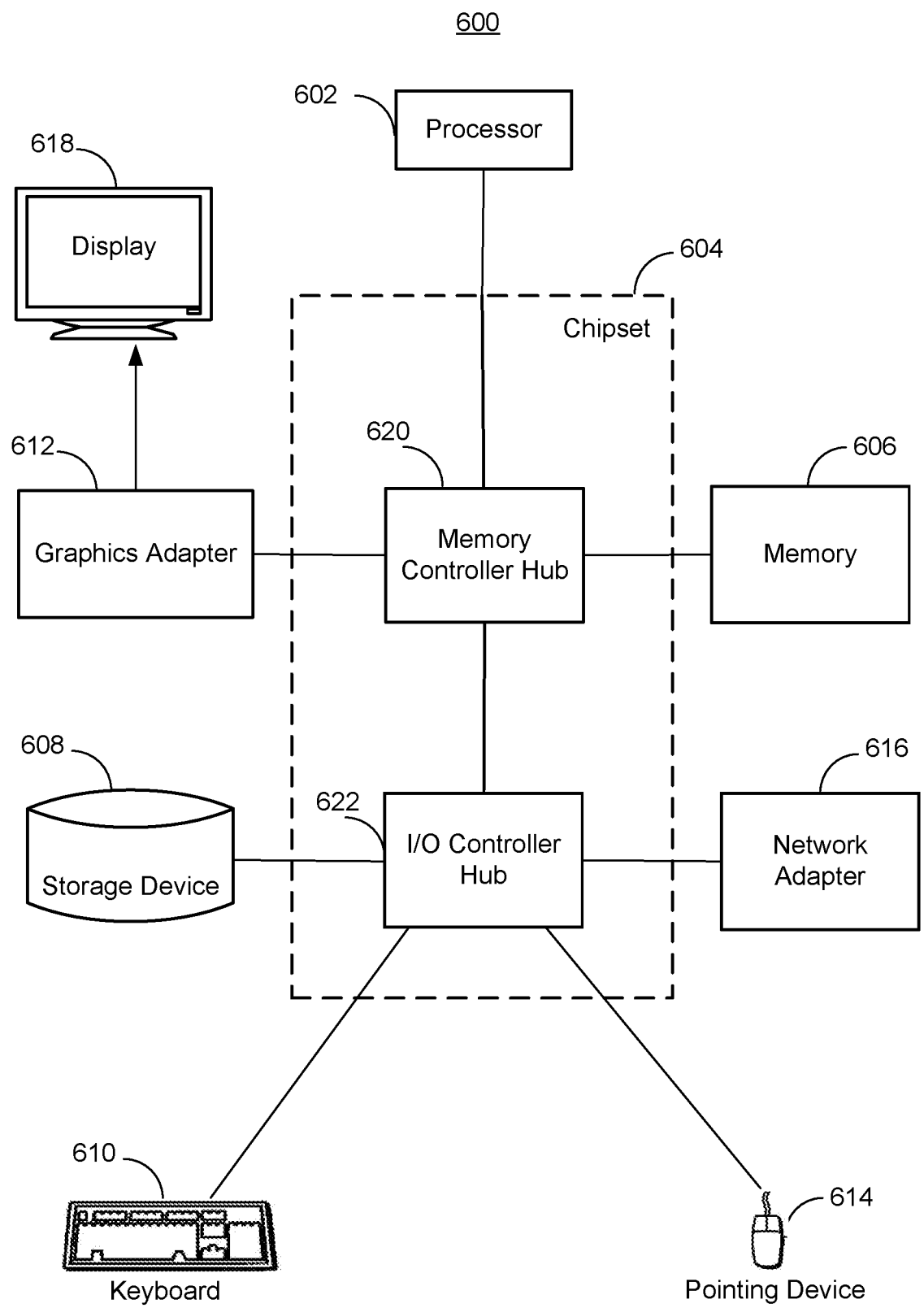
FIG. 6 is a high-level block diagram illustrating a functional view of a typical computer system for use as one of the entities illustrated in the environment of FIG. 1, in accordance with an embodiment.

FIG. 6 is a high-level block diagram illustrating a functional view of a typical computer system 600 for use as one of the entities illustrated in the environment of FIG. 1, in accordance with an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to the network 106.

As is known in the art, a computer 600 can have different and/or other components than those shown in FIG. 6. In addition, the computer 600 can lack certain illustrated components. For example, a computer system 600 acting as an online system 100 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device 110 may be a mobile phone with limited processing power, a small display 618, and may lack a pointing device 614. The online system 100, in contrast, may comprise multiple blade servers working together to provide the functionality described herein.

Alternative Embodiments

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the Figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer implemented method, the method comprising:
   receiving a search query from a client device associated with a user;
   obtaining search results matching the search query;
   identifying a set of attributes describing a context of the search query, the identified set of attributes comprising one or more attributes describing characteristics of the user;
   generating a data structure comprising a plurality of search coefficients, the plurality of search coefficients selected based on the identified set of attributes, the plurality of search coefficients comprising a conflicting search coefficient, wherein the conflicting search coefficient has at least a first value and a second value that is different from the first value;
   traversing the data structure to identify the conflicting search coefficient;
   for the conflicting search coefficient, resolving conflict based on precedence rules to obtain a resolved value of the conflicting search coefficient, wherein resolving the conflict based on the precedence rules to obtain the resolved value of the conflicting search coefficient comprises:
      determining a first hierarchy level of the first value of the conflicting search coefficient,
      determining a second hierarchy level of the second value of the conflicting search coefficient, and
      selecting one of the first value and the second value as the resolved value based on the first and second hierarchy levels;
   ranking the obtained search results based on the resolved value of the conflicting search coefficient; and
   providing the ranked search results for presentation to the client device.

2. The method of claim 1, wherein a value associated with a lower level of the hierarchy has higher precedence compared to a value associated with higher level of the hierarchy.

3. The method of claim 1, wherein the data structure is represented as a plurality of nested objects and conflicting values of a conflicting search coefficient are included in different nested objects, the nested objects comprising a parent object related to a child object by a parent-child relation, wherein parameters associated with the child object have higher precedence compared to parameters associated with the parent object.

4. The method of claim 3, wherein a nested object is represented using JavaScript Object Notation (JSON) format.

5. The method of claim 1, wherein the identified set of attributes further comprises one or more attributes describing characteristics of the query.

6. The method of claim 1, wherein the identified set of attributes further comprises one or more attributes describing a type of object being searched by the user.

7. The method of claim 1, wherein the data structure comprises a plurality of groups of values of search coefficients, a group of values of search coefficients comprising one or more values of search coefficients, wherein at least a first group and a second group comprise conflicting values of a same search coefficient.

8. The method of claim 7, wherein the plurality of groups of values of search coefficients comprises a general group and one or more specific groups, wherein a specific group is applicable to one of: a specific organization, a specific type of object, a specific user, or a specific group of user.

9. The method of claim 8, wherein the one or more specific groups comprise a specific group for a particular organization, wherein the specific group for the particular organization is associated with a lower hierarchy level compared to the general group.

10. The method of claim 9, wherein the one or more specific groups comprise a specific group for a particular user, wherein the specific group for the particular user is associated with a lower hierarchy level compared to the specific group for the particular organization.

11. The method of claim 9, wherein the one or more specific groups comprise a specific group for a particular A/B experiment group, wherein the specific group for the particular A/B experiment group is associated with a lower hierarchy level compared to the specific group for the particular user.

12. A non-transitory computer readable storage medium storing executable computer program instructions, the computer program instructions comprising instructions that when executed cause a computer processor to:
   receive a search query from a client device associated with a user;
   obtain search results matching the search query;

identify a set of attributes describing a context of the search query, the identified set of attributes comprising one or more attributes describing characteristics of the user;

generate a data structure comprising a plurality of search coefficients, the plurality of search coefficients selected based on the identified set of attributes, the plurality of search coefficients comprising a conflicting search coefficient, wherein the conflicting search coefficient has at least a first value and a second value that is different from the first value;

traverse the data structure to identify the conflicting search coefficient;

for the conflicting search coefficient, resolve conflict based on precedence rules to obtain a resolved value of the conflicting search coefficient, wherein the instructions for resolving the conflict based on the precedence rules to obtain the resolved value of the conflicting search coefficient comprise instructions that when executed cause a computer processor to:
  determine a first hierarchy level of the first value of the conflicting search coefficient,
  determine a second hierarchy level of the second value of the conflicting search coefficient, and
  select one of the first value and the second value as the resolved value based on the first and second hierarchy levels;

rank the obtained search results based on the resolved value of the conflicting search coefficient; and provide the ranked search results for presentation to the client device.

13. The computer readable medium of claim 12, wherein a value associated with a lower level of the hierarchy has higher precedence compared to a value associated with higher level of the hierarchy.

14. The computer readable medium of claim 12, wherein the data structure is represented as a plurality of nested objects and conflicting values of a conflicting search coefficient are included in different nested objects, the nested objects comprising a parent object related to a child object by a parent-child relation, wherein parameters associated with the child object have higher precedence compared to parameters associated with the parent object.

15. The computer readable medium of claim 12, wherein the data structure comprises a plurality of groups of values of search coefficients, a group of values of search coefficients comprising one or more values of search coefficients, wherein at least first group and a second group comprise conflicting values of a same search coefficient.

16. A computer system comprising:
  a non-transitory computer-readable storage medium storing executable computer program instructions, the computer program instructions comprising instructions that when executed cause a computer processor to perform steps, comprising:
    receiving a search query from a client device associated with a user;
    obtaining search results matching the search query;
    identifying a set of attributes describing a context of the search query, the identified set of attributes comprising one or more attributes describing characteristics of the user;
    generating a data structure comprising a plurality of search coefficients, the plurality of search coefficients selected based on the identified set of attributes, the plurality of search coefficients comprising a conflicting search coefficient, wherein the conflicting search coefficient has at least a first value and a second value that is different from the first value;
    traversing the data structure to identify the conflicting search coefficient;
    for the conflicting search coefficient, resolving conflict based on precedence rules to obtain a resolved value of the conflicting search coefficient, wherein resolving the conflict based on the precedence rules to obtain the resolved value of the conflicting search coefficient comprises:
      determining a first hierarchy level of the first value of the conflicting search coefficient,
      determining a second hierarchy level of the second value of the conflicting search coefficient, and
      selecting one of the first value and the second value as the resolved value based on the first and second hierarchy levels;
    ranking the obtained search results based on the resolved value of the conflicting search coefficient; and
    providing the ranked search results for presentation to the client device.

17. The system of claim 16, wherein a value associated with a lower level of the hierarchy has higher precedence compared to a value associated with higher level of the hierarchy.

18. The system of claim 16, wherein the data structure is represented as a plurality of nested objects and conflicting values of a conflicting search coefficient are included in different nested objects, the nested objects comprising a parent object related to a child object by a parent-child relation, wherein parameters associated with the child object have higher precedence compared to parameters associated with the parent object.

19. The system of claim 16, wherein the data structure comprises a plurality of groups of values of search coefficients, a group of values of search coefficients comprising one or more values of search coefficients, wherein at least a first group and a second group comprise conflicting values of a same search coefficient.

* * * * *